(12) United States Patent
Ferreira et al.

(10) Patent No.: US 12,418,551 B2
(45) Date of Patent: Sep. 16, 2025

(54) EFFICIENT ENTROPY-GUIDED BYZANTINE ATTACKER IDENTIFICATION IN FEDERATED LEARNING

(71) Applicant: Dell Products L.P., Round Rock, TX (US)

(72) Inventors: Paulo Abelha Ferreira, Rio de Janeiro (BR); Pablo Nascimento da Silva, Niterói (BR); Maira Beatriz Hernandez Moran, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 18/365,521

(22) Filed: Aug. 4, 2023

(65) Prior Publication Data

US 2025/0055864 A1 Feb. 13, 2025

(51) Int. Cl.
*H04L 9/40* (2022.01)
(52) U.S. Cl.
CPC .............................. *H04L 63/1425* (2013.01)
(58) Field of Classification Search
CPC .......... G06N 3/045; G06N 20/00; G06N 3/08; G06N 20/20; G06N 3/04; G06N 3/048; G06N 3/084; G06N 3/09; G06N 3/098; G06N 3/044; G06N 3/047; G06N 3/063; H04L 9/50; H04L 9/3239; H04L 9/3247; H04L 2209/56; H04L 63/123; H04L 2209/72; H04L 41/0668; H04L 43/0847; H04L 63/0442; H04L 63/0807; H04L 63/083; H04L 63/0861; H04L 63/12; H04L 63/1441; H04L 67/10; H04L 67/1097; H04L 9/002; H04L 9/12; H04L 9/30; H04L 9/32; H04L 9/3226; H04L 9/3236; H04L 9/3242; G06F 21/602; G06F 21/554; G06F 11/0709; G06F 11/0751; G06F 11/079; G06F 11/2023; G06F 17/18; G06F 21/00; G06F 21/566; G06F 21/6245; G06F 2201/81; G06F 2201/83; G06F 8/70; G06F 9/54; G06F 9/546

See application file for complete search history.

(56) References Cited

PUBLICATIONS

Velicheti et al., Secure Byzantine-Robust Distributed Learning via Clustering, Velicheti et al (Year: 2021).*

(Continued)

*Primary Examiner* — Ryan J Jakovac
(74) *Attorney, Agent, or Firm* — Workman Nydegger (57) ABSTRACT

One example method includes performing various operations in a federated learning environment that includes nodes configured and operable to communicate with a central server. The operations include gathering aggregate gradient information from clusters that each include a respective group of some of the nodes, examining the respective gradient information for each of the clusters, and identifying outlier clusters based on the respective aggregate gradient information of those clusters, for each of the clusters identified as an outlier cluster, setting all the nodes in those clusters as suspect nodes, and performing a clustering operation that comprises reassigning each of the suspect nodes to one of the clusters, and a decision to reassign any given one of the suspect nodes is based on an amount of information expected to be obtained as a result of that decision.

18 Claims, 3 Drawing Sheets

(56) References Cited

PUBLICATIONS

Velicheti et al., "Secure Byzantine-Robust Distributed Learning via Clustering." arXiv preprint arXiv:2110.02940 (2021).
Ferreira et al., U.S. Appl. No. 18/045,527, filed Oct. 11, 2022, and entitled Revealing Byzantine Attackers Through Smart Re-Clustering in Federated Learning.

* cited by examiner

EFFICIENT ENTROPY-GUIDED BYZANTINE ATTACKER IDENTIFICATION IN FEDERATED LEARNING

FIELD OF THE INVENTION

Embodiments of the present invention generally relate to federated learning. More particularly, at least some embodiments of the invention relate to systems, hardware, software, computer-readable media, and methods, for identifying a Byzantine attacker in a federated learning environment.

BACKGROUND

Federated Learning (FL) is a distributed framework for machine learning (ML) where nodes jointly train a model without ever sharing their data with each other. This is an important area for companies interested in providing infrastructure for private distributed ML efforts, such as massive deployment of ML models to the edge where data must be kept local due to compliance, cost or strategic reasons.

Even though FL can offer strong privacy guarantees, it suffers from specific security issues not necessarily present in other ML scenarios. For instance, it has been noted in the literature that aspects of distributed learning approaches, such as the distributed nature itself, architectural design, and data constraints, has enabled new failure modes and attack surfaces.

Recently there has significant attention paid to Byzantine failures in FL. In general, Byzantine attacks refer to those attacks in which one or more nodes of an FL environment are taken over by malicious players that can then disrupt coordination and data transfer. In FL, Byzantine attacks are often implemented by modifying the exchanged gradient and thus disrupting model training and convergence. Although Byzantine attackers may be identified, in some circumstances, by keeping track of suspect nodes across a cluster of nodes that forms part of the FL environment, such an approach may not always be computationally efficient, such as in scenarios involving a large number of nodes and clusters.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to federated learning. More particularly, at least some embodiments of the invention relate to systems, hardware, software, computer-readable media, and methods, for identifying a Byzantine attacker in a federated learning environment.

One example embodiment of the invention may comprise an extension of the SHARE algorithm (Secure Hierarchical Robust Aggregation) implemented in an FL environment that may include, for example, hundreds or thousands of nodes. As noted herein, clustering of nodes in an FL environment in an attempt to identify a Byzantine attacker may be a time-consuming, and resource-intensive, process. Thus, an example embodiment of the invention may operate to reduce, relative to conventional approaches, the number of clustering operations required to be performed. In an embodiment, a method may determine a 'best' allocation of clients, or nodes, to clusters. This 'best' allocation may be based on the respective informational content, also referred to herein as the 'entropy,' of different possible node clustering decisions. In general, preference is given to node clustering decisions that provide information, or the most information, regarding whether or not a suspicious node is an attacker, while clustering decisions that would not provide any such information are disfavored. In this way, an embodiment may perform only those node clustering decisions that are expected to advance the process for identifying the attacker. By eliminating non-productive clustering operations, an embodiment may be computationally efficient, and also enable more rapid response to attacks due to the increased speed with which problematic nodes can be identified.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that both productive and non-productive clustering processes, in terms of the ability of those processes to generate information about an attacker, may be identified at the outset before the clustering processes are actually performed. An embodiment may be computationally efficient relative to approaches that do not, or are not able to, identify clustering operations that produce no new information about an attacker. An embodiment may, by efficient clustering operations, enable a more rapid identification of, and response to, an attacker. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. General Aspects of an Example Embodiment

In general, an embodiment of the invention comprises a method that operates to identify one or more Byzantine attackers in an FL (federated learning) scenario in an efficient and effective manner. An embodiment may involve the use of a first principles approach based on information theory to guide the identification or problematic nodes by maximizing the amount of expected information from possible node clustering assignments. More particularly, in one embodiment, a method is employed to identify Byzantine suspect nodes that is efficient in terms of execution and optimal on the expected amount of information gathered from a given re-clustering of nodes.

One circumstance that may be resolved by one or more embodiments concerns protecting the FL process while keeping resource use at a minimum. Thus, a method according to one embodiment may be run using less resources while having an effective security protocol in place. More specifically, we want to address the following two problems. Some example aspects and features of one or more embodiments will be apparent from the following discussion of FIG. 1.

Figure 1:
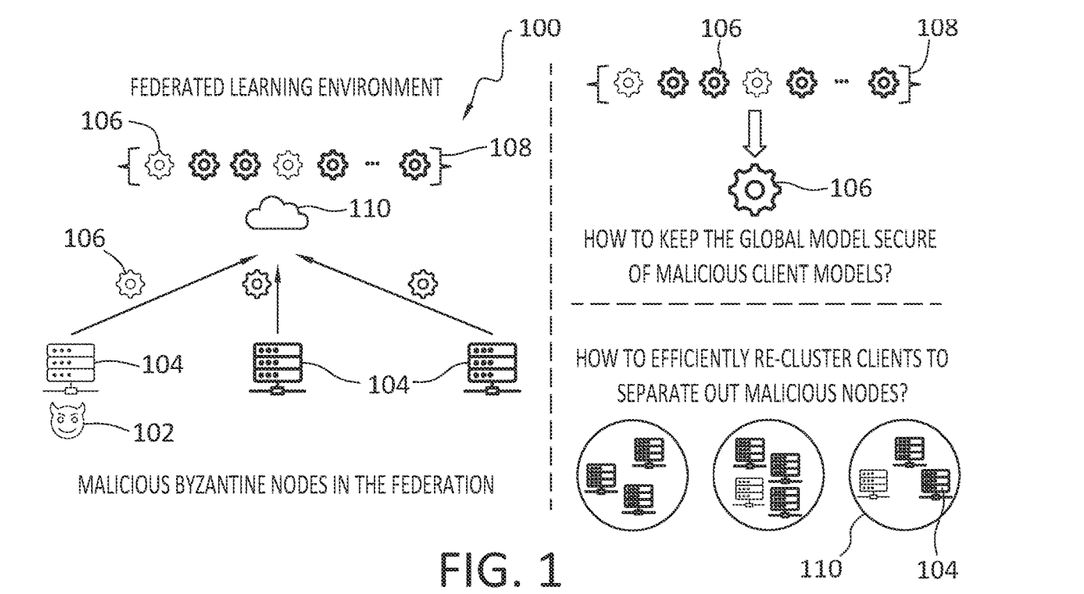
FIG. 1 discloses aspects of operations and considerations relating to a federated learning environment.

One aspect illustrated in FIG. 1 relates to the ability of one or more embodiments to keep the model updates in a federated learning environment 100 secure from Byzantine attackers. In more detail, Byzantine attackers 102 are those that take control of a node 104, such as an edge device for example, in the federation, by modifying the gradients produced by the node and trying to change the final model 108, which may be hosted at a central server 110, trained in the federation. To avoid this kind of attack, an embodiment of the invention may apply secure aggregation of gradients in the federation so the nodes are not informed about other nodes gradients, making the attack less effective. An embodiment may also provide robust aggregation where, during the aggregation of gradients, a method according to the embodiment may operate to smooth the gradients of the federation by taking the mode, discarding outliers, and/or performing other actions calculated to smooth the gradients.

Note that as used herein, a 'gradient' includes information generated by a node, such as an edge device for example, with respect to the operation of an instance of a model that is running at the node. The gradient information may be provided to a central server that maintains the model, and the central server may use the gradient information to update the model. When the model has been updated with the gradient information from the nodes in the federation, the updated model may then be pushed by the central server out to the nodes for instantiation at the nodes.

Another example aspect of an embodiment of the invention relates to the ability of such an embodiment to avoid unnecessary processing with secure aggregation via clustering. One particular method for making federated learning more secure is the use of secure aggregation via clustering, as disclosed in "Velicheti, Raj Kiriti, DerekXia, and Oluwasanmi Koyejo. '*Secure Byzantine-Robust Distributed Learning via Clustering.*' arXiv preprint arXiv:2110.02940 (2021)" ("Velicheti"), which is incorporated herein in its entirety by this reference.

In secure aggregation via clustering, each node, such as nodes 104 in FIG. 1, in the FL federation is assigned to a cluster 110 of nodes 104. Each cluster 110 performs a secure aggregation mechanism to guarantee that all information is secure and transmitted to the cluster head to be aggregated. Then, robust aggregation is used to aggregate the resulting gradients 106 of each cluster 110. Note that an embodiment may operate to avoid a need for a large number of re-clusterings of the nodes by monitoring the gradient convergency produced during the training, thus avoiding resource-intensive repeated clustering operations, while still obtaining a good convergence of the final centralized model.

B. Context for an Example Embodiment of the Invention

As noted earlier, Velicheti discloses creation of a robust and efficient private FL framework for being resilient to disruptive Byzantine attacks. However, the solution proposed there requires a large amount of processing time to guarantee any security of the model, and the proposed re-clustering procedure is computationally expensive. By way of contrast, one embodiment of the invention operates to increase the performance of this defense by reducing the number of re-clustering iterations that are needed to identify the compromised nodes so that action may be taken to protect the model from the attacker.

Following is an overview of Byzantine attacks in federated learning, when a malicious agent takes control of one node of the federation and tries to manipulate the updates of the central model. Subsequent to that overview, information is provided concerning one of the defensive mechanisms, namely, SHARE, for this kind of attack, which produces model updates that are robust against Byzantine attacks but still very computationally expensive. As discussed in more detail below, an embodiment may address and resolve the problem of computational expense necessitated by the SHARE approach.

B.1 Byzantine Attacks in FL

The main objective of a Byzantine attack is to prevent the convergence of the correct global model to an optimized form. This is performed mainly by manipulating one of the clients to send defective updates to the server, thereby introducing incorrect bias in the gradient aggregation process performed at the server. According to U.S. patent application Ser. No. 18/045,527, filed Oct. 11, 2022, and entitled "REVEALING BYZANTINE ATTACKERS THROUGH SMART RE-CLUSTERING IN FEDERATED LEARNING", incorporated herein in its entirety by this reference, a malicious client can induce the aggregation rule result ($F_{lin}$) to yield a constant value T. Considering that $F_{lin}$ is defined as $F_{lin}(\delta_1 \ldots \delta_m) = \Sigma_u \alpha_u \delta_u$, where each $\alpha_u$ are non-zero scalars, if the Byzantine malicious client sends $\delta_m = (1/\alpha_m) * T - \Sigma m - 1u = 1(\alpha_u/\alpha_m) * \delta_u$, then $F_{lin} = T$.

Supposing that the malicious client could access the updates of other clients, the attack would be immediate. However, this is not realistic, since most FL configurations implement protocols to ensure privacy, including protecting the updates from inadequate access. In this way, the malicious client must estimate the respective updates of the other clients, or the sum of those updates, that is, the sum of the gradients. Note that when the training process is advanced, the model is close to convergence, so the updates sent by the clients in consecutive rounds are very similar. Thus, the malicious client can estimate the sum of the updates of other clients from a previous round, just by subtracting its own update from the global model. Based on this information, the malicious client tries to replace the global model. For that, it creates a special local update that nullifies the updates of the other clients and boosts the influence of its own update.

B.2 SHARE—Secure Hierarchical Robust Aggregation

As noted earlier, Velicheti presented SHARE, a framework that incorporates defenses against Byzantine attacks, and at the same time enhances privacy aspects of the node data. SHARE is formed by two steps. In the first step, the clients are allocated in clusters randomly. Clients in each cluster mask their own updates using pairwise secret keys shared between them. This enhances the privacy of the clients and their individual updates, and the central server learns only the mean of the updates. In the next step of SHARE, the secure cluster averages are filtered through robust aggregation, such as by way of median or Zeno, for example, to eliminate clusters with Byzantine clients, according to the cluster updates. These two steps are repeated several times, and in each global epoch, the clients are re-clustered randomly. One of the main limitations of this framework is the communication cost demanded by the key exchange sharing and the increasingly computational burden requirements, both in terms of time consume and computational resources consumed, since the process is repeated many times. As should be apparent, the problem becomes particularly acute in a typical FL network of hundreds or thousands of nodes. The SHARE algorithm is reproduced below as 'Algorithm 1.'

---

Algorithm 1 SHARE (Secure Hierarchical Robust Aggregation)

0: Server:

1: for t = 0, . . . , T − 1 do
2:   for r = 1, . . . , R do
3:     Assign clients to clusters
      $S = \mathcal{M}_1 \cup \ldots \mathcal{M}_i \ldots \cup \mathcal{M}_c$ with $|\mathcal{M}_i| = |\mathcal{M}_j| \forall i, j \subset |c|$
4:     Compute secure average
      $g_j^r \leftarrow \text{SecureAggr}(\{\Delta_i\}_{i \in \mathcal{M}_j}) = \sum_{i \in \mathcal{M}_j} u_i, \forall j \in |c|$
5:     $g^r \leftarrow \text{RobustAggr}(\{g_j^r\}_{j \in |c|})$
6:   end for
7:   if stopping criteria met then
8:     break
9:   end if 10:   Push $x^t = x^{t-1} + \eta \frac{1}{R} \sum_r g^r$ to the clients 11: end for
    Client:

12: for each client $i \in S$ (if honest) in parallel do
13:   $x_{i,0}^t \leftarrow x^t$
14:   for k = 0, . . . , K − 1 do ---continued Algorithm 1 SHARE (Secure Hierarchical Robust Aggregation)

15:     Compute an unbiased estimate $g_{i,k}^t$ of $\nabla f_i(x_{i,k}^t)$
16:     $x_{i,k+1}^t \leftarrow \text{ClientOptimize}(x_{i,k}^t, g_{i,k}^t, \eta_i, k)$
17:   end for 18:   $\Delta_i = \frac{n_i}{n}(x_{i,K}^t - x^t)$ 19:   Push $\Delta_i$ to the assigned clusters using secure aggregation
20: end for
21: return $x^T$

---

Figure 2:
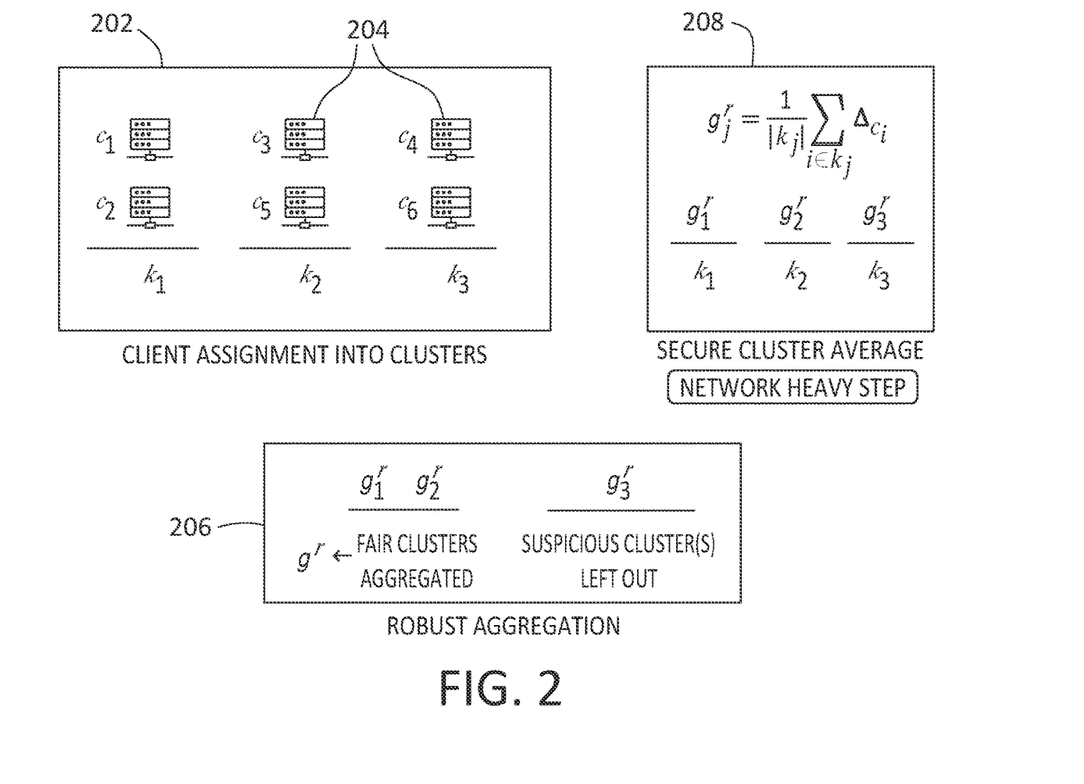
FIG. 2 discloses aspects of example aggregation operations and clustering operations.

Next, and with reference as well to FIG. 2, the SHARE protocol is discussed in more detail, so as to better illustrate, by way of comparison, various aspects on one example embodiment of the invention. The two main steps of SHARE are secure aggregation and robust aggregation. The SHARE protocol runs on top of a generic FL, assuming there is clustering 202 of clients 204 and that secure aggregation is performed at each cluster, generating one (summed) gradient $g_j^r$ per cluster j and per re-clustering round r. That is, SHARE runs a loop of R re-clusterings and at each re-clustering, SHARE aggregates a $g^r$ by computing robust aggregation 206 with all the $g_j^r$ for the current reclustering round. As a result of the robust aggregation 206, a suspicious cluster may be left out. After R re-clustering rounds, a list is defined of size R containing different aggregated gradients $g^r$. When it is time to compute the central gradient, SHARE then computes a mean over all $g^r$. Note that the number of re-clusterings R is defined without any clear criterion and should be large enough to allow a good security of the distributed gradients. Note also that, as indicated in FIG. 2, per cluster averaging 208 incurs a high network cost in terms of bandwidth and processing resources consumed. Finally, 202, 206, and 208, are performed R times for each re-clustering.

C. Detailed Discussion of an Example Embodiment

C.1 Overview

One example embodiment comprises a lightweight method for early stopping of a re-clustering process in secure FL by clustering. As noted elsewhere herein, a typical re-clustering process is a highly resource-intensive, and time-consuming, task since each node in the federation must be assigned to a given cluster, that is, all of the nodes must be clustered. Then the resulting gradients from these nodes must be managed, and secure aggregation of gradients applied, then followed by the robust aggregation.

One example embodiment comprises an extension of the SHARE method disclosed in Velicheti. This embodiment may operate to reduce the number of re-clustering steps needed to identify the node(s) where an attacker is operating. That is, rather than performing all possible re-clustering operations, only re-clustering operations are performed that are expected to result in the generation of information relating to a suspected attacker. In general, this example embodiment employs a method and algorithm that operate to determine the best allocation of clients, or nodes, to clusters. This allocation is based on the use of information theory and is determined by identifying which clustering operations are theoretically information optimal.

In more detail, an example embodiment comprises a method that determines the respective information content of each possible client cluster assignment decision. In an embodiment, this method calculates the entropy of a given possible clustering decision and then ensures that entropy, or information, is maximized for each decision. An embodiment of the method may generic so as to enable definition of the prior probability of a client, in general, being fair. That is, a 'fair' client or node may be deemed as such based on a determination that there is a low probability that the node has been compromised by an attacker. The probability parameter may be initially set to 0.5 in the case where no information is available, but may be modified through information acquired later by various methods. Thus a method according to one embodiment may lend itself to parameterization by a security team.

C.2 Information Content of a Cluster

In an embodiment the RobustAggregation function is extended to also output the robustness metric per cluster. Since the function uses that metric to decide which clusters will be considered for aggregation, it may also output the metric per cluster. This metric may enable association of a suspicion score to each cluster and then selection of those clusters above a certain threshold as suspicious clusters, while those clusters below the threshold may be deemed fair clusters. In an embodiment, all clients belonging to a suspicious cluster are assigned, at least initially, as 'suspect.' Conversely, all clients in a fair cluster are considered 'fair.'

In an embodiment, it is not possible to determine whether a suspect client is a threat based solely on its participation in a suspicious cluster. This is because there may be more than one suspect client in a cluster and there is no way to tell which client(s) is/are suspicious and how much each contributed to the cluster deemed as suspicious. However, if a client is the only suspect in a cluster, then it may be concluded that the client is responsible for that cluster being deemed suspicious and that client is thus a threat. Following is a brief summary of considerations relating to information content associated with different cluster scenarios.

For example, when a cluster with only one suspect node is identified as a suspicious cluster, it can be concluded that the suspicious node is a threat, and in this way 1 bit of information is gained. As another example, a cluster that includes only 'fair' clients does not provide any information. Finally, a cluster with more than one suspect node only provides information if that cluster is determined to be a 'fair' cluster, that is, 1 bit of information is obtained per suspect node that is determined to be fair. This is because a 'fair' cluster, by definition only includes fair clients and, accordingly, any clients of the cluster that were deemed suspicious can be concluded to be, in fact, fair, and hence the information is gained.

In general, the amount of information gained is the amount of suspects uncovered as fair, or all suspects in the cluster. More concretely, this information content for a given possible clustering is given by $|s_k|f^{|s_k|}$, where $s_k$ is the number of suspects in cluster k and f is the prior probability of a suspect being fair. Therefore, prior to running an expensive re-clustering process, an embodiment may generate an estimate of the amount of information expected to be gained, for each potential cluster c, as $H(|S_c|; f)=|s_k|f^{|s_k|}$.

The concepts discussed above are generally disclosed in FIG. 3. As shown there, at 302, cluster assignments 304 may be made to target suspicious clients. By gathering information about possible cluster assignments, an embodiment may make an optimal allocation of nodes to clusters, that is, an allocation which maximizes information gain. In a robust aggregation process 306, clusters may be identified as suspicious if they include at least one suspicious client. Isolated suspicious clients may thus lead to the cluster that they are assigned to being deemed 308 an outlier cluster. Because an embodiment is focused on making cluster assignments based on information gain, targeted isolation of suspicious nodes may decrease the required number of re-clustering operations.

C.3 Relative Entropy for Different Re-Clustering Choices

C.3.1 Total Entropy for a Re-Clustering Choice

As noted above, [1] the number of suspects and [2] the prior probability of fairness, together determine the information content of a single cluster. At each re-clustering step, however, an embodiment may assign clients to k clusters and therefore will have k different information values, one per cluster. Without loss of generality, the total information content of a re-clustering operation r may be defined as the sum of the respective information content of each of the clusters defined by that operation, thus:

$$H^r(K^r; f) = \sum_{k \in K^r} |s_k| f^{|s_k|}$$

where $K^r$ is the set of clusters for re-clustering operation r, $s_k$ is the number of suspects in cluster k, and f is the prior probability of a suspect being fair, and 1−f is the prior probability of a suspect being malicious. The particular value of this fairness parameter f could be determined by a suitable process, or it could be set to a high number, such as 0.95 or 0.99 for example, if the network is reasonably trusted to be fair. From a previous round of RobustAggregation, it may be known which clients are suspects. With this information, an embodiment may determine how to distribute the known fair, and suspect, clients into the m=|K| clusters.

To illustrate, if there are 6 suspect clients and m=4 clusters, there are five different possible re-clusterings that could be implemented, namely, 3210, 2220, 4200, 3300, and 1500. As indicated in these examples, there are 4 clusters, and the total number of suspect clients in each case is 6, for example, 3+2+1+0. Here, the order of the numbers is not significant, only the totals, and the number of clusters. In the example clustering 3210, (3) suspect clients are allocated to the first cluster, (2) to the second cluster, (1) to the third cluster, and none (0) to the fourth cluster.

As these examples illustrate, an embodiment may use a string of m characters to represent a re-clustering. Thus, and as noted above, the re-clustering 3300 means that three suspects are assigned to each of to clusters 1 and 2, and no suspects to clusters 3 and 4. The total entropy, or information, for this potential cluster 3300 may be calculated (using $|s_k|f^{|s_k|}$ for each cluster k, and s is the number of suspects in that cluster) as follows: $3f^3+3f^3=6f^3$ (total information, or entropy, for cluster 3300) or this could be expressed as $H^r(3300; f)=6f^3$. On the other hand, for the potential cluster 3210, $H^r(3210; f)=3f^3+2f^2+f$ (total entropy for cluster 3210). In general, and as suggested by the foregoing examples, the cluster assignment string A will contain the constants for a polynomial of the form $\sum_{i=0}^{|A|-1} A_i f^{A_i}$ for each character index from 0 to |A|−1.

In order to decide, for this example, whether re-clustering 3300 is better than 3210, an embodiment may compare their respective total entropy values: $6f^3>3f^3+2f^2+f$. Solving this equation defines two possibilities, namely, either: −⅓<f<1, or f>1. However, since the probability of a cluster being fair f cannot be less than 0, nor greater than 1, it may be concluded that 0<f<1. That is, the first re-clustering is always better.

As another example, comparing assignments 2211 with 3111 produces the inequation $4f^2+2f>3f^3+3f$, whose solution gives $\frac{1}{3}<f<1$. Note that this is open in 1, that is, when f=1, the two clustering assignments have the same amount of information. In general, when f=1, all assignments will have the same amount of information. This may be checked through the generic polynomial formula $\Sigma_{i=0}^{|A|-1} A_i f^{A_i}$. When f=1, this formula reduces to $\Sigma_{i=0}^{|A|-1} A_i = |A|$, which is also the sum of all characters in the assignment string. Intuitively, when f=1, all clients will always be fair and thus no information can be gained from the cluster assignment.

C.3.2 Relative Entropy for Transitions

As noted earlier, computing total entropy for each assignment of each cluster may, in some circumstances at least, be a naïve solution that is too inefficient. Thus, one example embodiment comprises a pre-computation method and algorithm based on node assignment transitions. Beginning with four clusters, that each have no suspect nodes, that is, 0000, the only possible next assignment step is putting a suspect into one of the four clusters, thus: 0001, 0010, 0100 or 1000. From an information content perspective, these are all equivalent decisions, leading to the same total entropy. Furthermore, if there is a suspect node to assign, one of the four clusters must be selected for the assignment, with the result that one of four decisions will have to be taken, in this example. In other words, the transition 0→1, for one of the clusters, must occur, that is, one of the clusters with 0 suspects will now have 1 suspect, thereby adding information to the aggregate entropy amount for the 4 clusters.

Continuing with the aforementioned example, one an assignment has been made, such as from 0000 to 0010, then a decision must be made for the next suspect. This decision entails two possibilities in terms of transitions, namely, 0→1 or 1→2. That is, the second suspect is either added to one of the clusters with 0 suspects, or is added to the cluster with 1 suspect. Each of these possible transitions may add a different amount of information to the total entropy.

In particular, if the decision is made to add the suspect to the first cluster, then, the transition 0→1 adds information as follows:

$$H(1010; f) - H(0010|; f) = 2f - f = f$$

bits of information to the total entropy.

Note that the same result, in terms of entropy gained, would be obtained by adding the suspect to any other cluster with 0 suspects, that is:

$$H(1010; f) = H(0110; f) = H(0011; f) = 2f$$

In this approach then, only the transition itself, such as 0→1 for example, is considered, and the particular cluster to which the suspect was assigned is not important. The other transition option for consideration in this example is the transition 1→2 which adds:

$$H(0020; f) - H(0010|; f) = 2f^2 - f$$

bits of information to the total entropy.

Thus, the question now becomes, which of the two different transitions results in the greatest entropy. That is, a choice must be made between the two transitions: 0→1 and 1→2, adding 2f, and $2f^2-f$, bits of information each, respectively. The transition notation may be shortened to a single symbol, thus: $t_i := i-1 \to i$. Given the entropy equations above, namely, $H(t_1; f)=f$ and $H(t_2; f)=2f^2-f$, these can be rewritten, using the transition notation, as:

$$H(t_i; f) = if^i - (i-1)f^{i-1}$$

This formula may be used to decide which is the best transition, that is, assignment of a suspect to a cluster, to choose. For instance, solving for the inequation:

$$H(t_2; f) \geq H(t_1; f)$$

indicates that transition $t_1$ is always better. That is, there is no choice of valid interval for $f \in {]0,1[}$ that yields $H(t_2; f) \geq H(t_1; f)$ or $2f^2 - f > f$. Particularly, and taking the interval endpoints as examples, if f=0, the inequation yields 0>0, and if f=1, the inequation yields 1>1. However, this is not true of other transition comparisons as each comparison will yield a possibly different respective f interval.

For example, when deciding whether to assign a suspect to a cluster with 3 other suspects, or with 2 other suspects, the following would be compared $H(t_3; f) > H(t_2; f)$, or equivalently $3f^3 - 2f^2 \geq 2f^2 - f$. This inequality is true for $f \leq \frac{1}{3}$. Recall that this example is considering $f \in {]0,1[}$ because having f=0 and f=1 means that we either there are always suspects, that is, no node is fair, or the nodes are always fair, in which case there are no suspect nodes. Neither case provides further information, so the decisions in this example are irrelevant. That is, since no information would be expected to be gained by either of these assignments, neither assignment will be made.

In an embodiment then, attention is given to the comparison of transitions, such as the examples just described. More specifically, a method according to one embodiment may compare transitions according to the current state of the re-clustering process, that is, the number of suspects in each cluster. As seen above, the entropy calculation formula may be very inexpensive, in terms of both time and processing resources consumed, to compute for each decision.

According to an embodiment, the general formula for comparing contiguous transitions is then:

$$H(t_a; f) \geq H(t_{a-1}; f) \equiv af^a - (a-1)f^{a-1} \geq (a-1)f^{a-1} - (a-2)f^{a-2}$$

where a is the index of the higher transition. This formula, when divided by $f^{a-2}$ and rearranged simplifies to:

$$H(t_a; f) \geq H(t_{a-1}; f) \equiv af^2 - 2(a-1)f + (a-2) \geq 0$$

Which may be simplified further to produce the ratio:

$$H(t_a; f) \geq H(t_{a-1}; f) \leftrightarrow \frac{a-2}{a} \geq f$$

where the fraction on the left is bounded by 1, the highest value of f:

$$\lim_{a \to \infty} \frac{a-2}{a} = 1$$

Note that for large values of f, most transition comparisons will favor filling out clusters with fewer suspects.

As this disclosure makes clear then, whether contiguous transitions are being compared, using the formula above, or transitions in general are being compared, the computation will be elegant and simple. Furthermore, a node assignment choice will be information-theoretically optimal if the formula is used for every possible transition choice. This may ensure that the algorithm is efficient both in terms of execution, and in terms of expected amount of information gathered from a given re-clustering operation.

Below is an example algorithm according to one embodiment of the invention—in general, this algorithm may optimally assign suspects to clusters:

```
0: Server:
1: g ← SecureAggregation(C, K)
2: _, M ← RobustAggregation(g)
2: S ← SuspectClients(C, M)
# Assign suspects according to transition with higher information
3: for s=1,. . ., |S|
4:   k ← ClusterBestTransition(K)
5:   K[k].append(s)
5: i = 1
# Assign fair clients alternately to each cluster
6: for c ∈ C \ S
7:   K[i mod k].append(c)
8:   i ← i + 1
```

In general, this algorithm may operate to uncover the suspect clusters, and their suspect clients, from the metrics output by RobustAggregation, and may then assign all suspect clients to a cluster according to an information-theoretically optimal decision process according to one embodiment. In more detail, an embodiment may begin by computing SecureAggregation, which is may be a relatively expensive step that gathers an aggregate gradient per cluster. Next, RobustAggregation may be run to uncover suspect clusters by checking which ones are outliers in terms of their gradients. Then, the function SuspectClients may set all clients in a suspect cluster as suspects themselves. When this has been done, the function ClusterBestTransition may be run to determine the best assignment according to calculations on the expected amount of information gained. Finally, all fair clients may be spread and alternately assigned to each cluster.

As thus disclosed herein, an embodiment of the invention comprises a method to decrease the number of required re-clustering operations needed to uncover malicious nodes amongst suspect nodes. The example method is efficient in terms of computation and also information-theoretically efficient in terms of expected amount of information obtained for a given client cluster assignment. In one embodiment, part or all of the method may be performed by, and/or at the direction of, a central server that communicates with a federation of nodes to update a model maintained by the central server. However, no particular entity is required to perform or direct the method.

D. Example Methods

Figure 3:
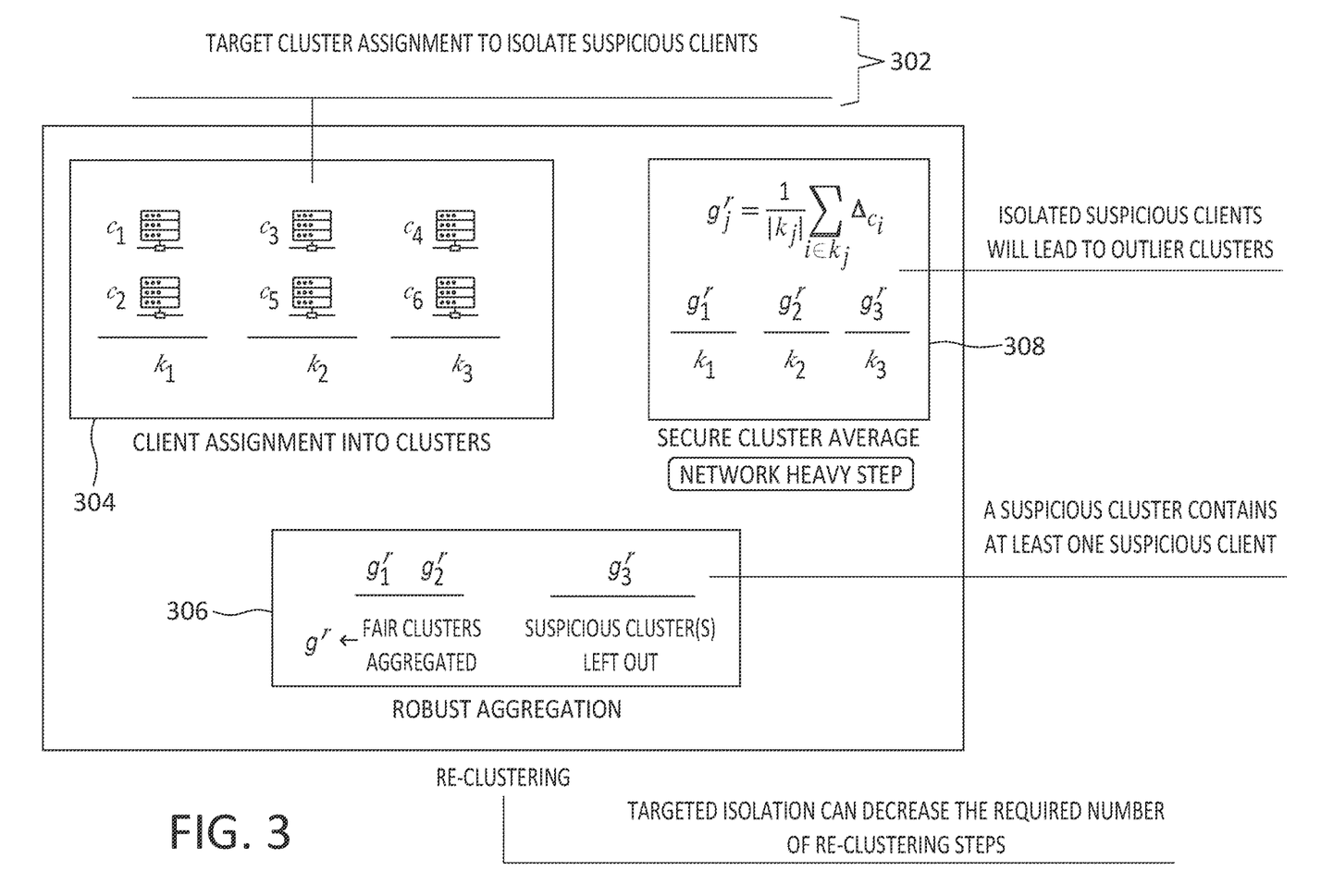
FIG. 3 discloses aspects of a method for optimal allocation of nodes to clusters.

It is noted with respect to the disclosed methods, including the example methods of FIGS. 1-3, and the disclosed algorithms, that any operation(s) of any of these methods and algorithms, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Further Example Embodiments

Following are some further example embodiments of the invention. These are presented only byway of example and are not intended to limit the scope of the invention in any way.

Embodiment 1. A method, comprising: performing operations in a federated learning environment that includes nodes configured and operable to communicate with a central server, wherein the operations comprise: gathering aggregate gradient information from clusters that each include a respective group of some of the nodes; examining the respective gradient information for each of the clusters, and identifying outlier clusters based on the respective aggregate gradient information of those clusters; for each of the clusters identified as an outlier cluster, setting all the nodes in those clusters as suspect nodes; and performing a clustering operation that comprises reassigning each of the suspect nodes to one of the clusters, and a decision to reassign any given one of the suspect nodes is based on an amount of information expected to be obtained as a result of that decision.

Embodiment 2. The method as recited in any preceding embodiment, wherein the gradient information relates to respective instances of a model, maintained in the central server, instantiated at each of the nodes.

Embodiment 3. The method as recited in any preceding embodiment, wherein one of the clusters is identified as an outlier cluster if one or more nodes of that cluster are suspect.

Embodiment 4. The method as recited in any preceding embodiment, wherein a suspect node is a node that is suspected to have been compromised by an attacker.

Embodiment 5. The method as recited in any preceding embodiment, wherein the performing of the clustering operation comprises performing fewer than all possible clustering operations.

Embodiment 6. The method as recited in any preceding embodiment, wherein the information resulting from reassignment of one of the suspect nodes to one of the clusters is based on a transition that occurred, or was expected to occur, as a result of that assignment.

Embodiment 7. The method as recited in any preceding embodiment, wherein the amount of information obtained is a function of a number of suspect nodes that are ultimately determined to be fair nodes at each cluster.

Embodiment 8. The method as recited in any preceding embodiment, wherein no information is gained by reassigning only fair nodes to one of the clusters.

Embodiment 9. The method as recited in any preceding embodiment, wherein, for a given one of the clusters, the amount of information is a function of [1] a number of suspect nodes in that given cluster, and [2] a prior probability of each of those suspect nodes as being a fair node.

Embodiment 10. The method as recited in any preceding embodiment, wherein all of the nodes that are fair nodes are distributed among the clusters after the clustering operation has been performed.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
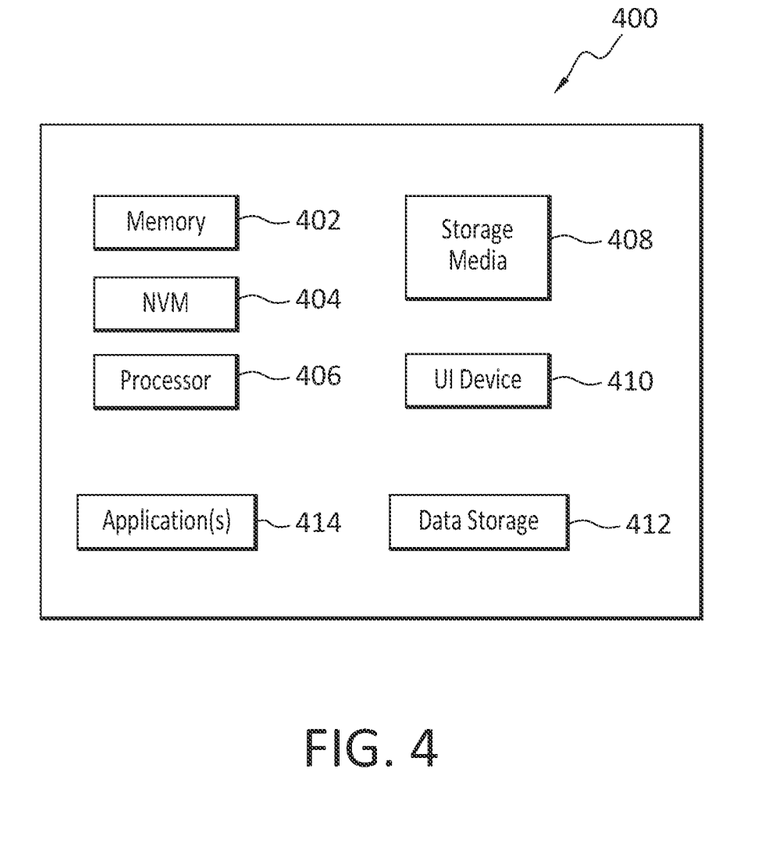
FIG. 4 discloses aspects of an example computing entity configured and operable to perform any of the disclosed methods, algorithms, processes, steps, and operations.

With reference briefly now to FIG. 4, any one or more of the entities disclosed, or implied, by FIGS. 1-3 and the disclosed algorithms, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, methods, algorithms, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing operations in a federated learning environment that includes nodes configured and operable to communicate with a central server, wherein the operations comprise:
gathering aggregate gradient information from clusters that each include a respective group of some of the nodes;
examining the respective gradient information for each of the clusters, and identifying outlier clusters based on the respective aggregate gradient information of those clusters;
for each of the clusters identified as an outlier cluster, setting all the nodes in those clusters as suspect nodes; and
performing a clustering operation that comprises reassigning each of the suspect nodes to one of the clusters, and a decision to reassign any given one of the suspect nodes is based on an amount of information expected to be obtained as a result of that decision and, for a given one of the clusters, the amount of information is a function of [1] a number of suspect nodes in that given cluster, and [2] a prior probability of each of those suspect nodes as being a fair node.

2. The method as recited in claim 1, wherein the gradient information relates to respective instances of a model, maintained in the central server, instantiated at each of the nodes.

3. The method as recited in claim 1, wherein one of the clusters is identified as an outlier cluster if one or more nodes of that cluster are suspect.

4. The method as recited in claim 1, wherein a suspect node is a node that is suspected to have been compromised by an attacker.

5. The method as recited in claim 1, wherein the performing of the clustering operation comprises performing fewer than all possible clustering operations.

6. The method as recited in claim 1, wherein the information resulting from reassignment of one of the suspect nodes to one of the clusters is based on a transition that occurred, or was expected to occur, as a result of that assignment.

7. The method as recited in claim 1, wherein the amount of information obtained is a function of a number of suspect nodes that are ultimately determined to be fair nodes at each cluster.

8. The method as recited in claim 1, wherein no information is gained by reassigning only fair nodes to one of the clusters.

9. The method as recited in claim 1, wherein all of the nodes that are fair nodes are distributed among the clusters after the clustering operation has been performed.

10. A non-transitory storage medium having stored therein instructions that are executable by one or more hardware processors to:
perform operations in a federated learning environment that includes nodes configured and operable to communicate with a central server, wherein the operations comprise:
gathering aggregate gradient information from clusters that each include a respective group of some of the nodes;
examining the respective gradient information for each of the clusters, and identifying outlier clusters based on the respective aggregate gradient information of those clusters;
for each of the clusters identified as an outlier cluster, setting all the nodes in those clusters as suspect nodes; and
performing a clustering operation that comprises reassigning each of the suspect nodes to one of the clusters, and a decision to reassign any given one of the suspect nodes is based on an amount of information expected to be obtained as a result of that decision and, for a given one of the clusters, the amount of information is a function of [1] a number of suspect nodes in that given cluster, and [2] a prior probability of each of those suspect nodes as being a fair node.

11. The non-transitory storage medium as recited in claim 10, wherein the gradient information relates to respective instances of a model, maintained in the central server, instantiated at each of the nodes.

12. The non-transitory storage medium as recited in claim 10, wherein one of the clusters is identified as an outlier cluster if one or more nodes of that cluster are suspect.

13. The non-transitory storage medium as recited in claim 10, wherein a suspect node is a node that is suspected to have been compromised by an attacker.

14. The non-transitory storage medium as recited in claim 10, wherein the performing of the clustering operation comprises performing fewer than all possible clustering operations.

15. The non-transitory storage medium as recited in claim 10, wherein the information resulting from reassignment of one of the suspect nodes to one of the clusters is based on a transition that occurred, or was expected to occur, as a result of that assignment.

16. The non-transitory storage medium as recited in claim 10, wherein the amount of information obtained is a function of a number of suspect nodes that are ultimately determined to be fair nodes at each cluster.

17. The non-transitory storage medium as recited in claim 10, wherein no information is gained by reassigning only fair nodes to one of the clusters.

18. The non-transitory storage medium as recited in claim 10, wherein all of the nodes that are fair nodes are distributed among the clusters after the clustering operation has been performed.

* * * * *

UNITED STATES PATENT AND TRADEMARK OFFICE
CERTIFICATE OF CORRECTION

| | | |
|---|---|---|
| PATENT NO. | : 12,418,551 B2 | Page 1 of 1 |
| APPLICATION NO. | : 18/365521 | |
| DATED | : September 16, 2025 | |
| INVENTOR(S) | : Paulo Abelha Ferreira et al. | |

It is certified that error appears in the above-identified patent and that said Letters Patent is hereby corrected as shown below:

In the Specification

<u>Column 7</u>
Line 4, change "may generic" to -- may be generic --

<u>Column 9</u>
Line 33, change "one an assignment has been made" to -- once an assignment has been made --

Signed and Sealed this
Sixteenth Day of December, 2025

John A. Squires
*Director of the United States Patent and Trademark Office*